Patented Mar. 30, 1943

2,314,893

UNITED STATES PATENT OFFICE 2,314,893

COFFEE OIL REFINING PROCESS

Herbert S. Polin, New York, Albert I. Nerken, Brooklyn, and Henry Wettingfeld, Jr., Bayside, Long Island, N. Y., assignors to Coffee X Corporation, a corporation of Delaware No Drawing. Application November 12, 1940, Serial No. 365,327

6 Claims. (Cl. 260—407)

This patent relates to a method for distilling the oil of the coffee bean, any species of the genus Coffea, so as to obtain products of a wide variety of uses.

The oil of the coffee bean contains, besides typical fatty acid glycerides, up to 12% or more of unsaponifiable matter, the content of unsaponifiable matter being dependent upon the method of extracting the oil, and, when solvent extraction is employed, on the solvent used. The method of treatment here proposed is designed to take advantage of both saponifiable and unsaponifiable portions, by a complex treatment consisting of chemically reacting and/or distilling the coffee oil, under various conditions of temperature and pressure, and in the presence or non-presence of different types of catalysts. The reactions involved in the steps of the process can only be indicated in a general way, since the chemistry of fatty acids is not fully developed, and that of sterols and other constituents of the unsaponifiable matter even less so. The process is unique in the mode of distillation used and in the raw material, coffee oil, processed; the chemistry of coffee oil is unique among vegetable oils, particularly as regards unsaponifiables. While fatty acids have been distilled for many years, the process described, hereinafter, differs from such processes in encouraging chemical reaction of the fatty acids while in the still, so that fatty acids are not the predominant product of the distillation. Further, no known process employs a controlled distillation of the total fat or oil to yield desired products, as disclosed.

The first step of the process will vary, depending on the final products desired. In one procedure, the coffee oil is charged into a pressure boiler or autoclave. To the oil is added the minimum quantity of water for hydrolysis of the glycerides present in the oil. The hydrolysis is conducted at an elevated temperature, say at 100° C., or somewhat higher, with the autoclave closed to prevent access of air and permit the maintaining of pressure, and in the presence of about 1% or less of Twitchell's reagent. Twitchell's reagent is a well known catalyst for the hydrolysis of fats and oils and may be prepared in a variety of ways. The preparation, however, always involves the reaction of sulfuric acid on mixtures of fatty and aromatic compounds to yield sulpho-compounds.

On the completion of hydrolysis, the autoclave is opened into a fractionating column. If desired, glycerin may now be recovered from the mixture of fatty acids and glycerine, by distilling it off under vacuum, preferably with the aid of superheated steam. By proper refluxing, the glycerin may be separated in a relatively pure state. Any fatty acids carried over into the fractionating column may be recovered as such or returned to the autoclave or still.

The autoclave is again cut off from the fractionating column, and heated, preferably slowly and with stirring, to the neighborhood of 250° C. The temperature is maintained, with stirring, for a prolonged period, upward of 10 or more hours. The autoclave is then connected to the fractionating column and the contents distilled under vacuum and preferably with the aid of superheated steam until the still temperature is in the neighborhood of 300° C. It is important in these operations to have the system free of air at all times.

The product remaining in the still ranges from a tough, rubbery material to a very hard, resinous compound. The higher the temperatures employed during the heating and distillation, the harder the resulting product. The heating period previous to distilling also influences greatly the amount of polymerization.

The fractions taken off the column show a wide variety of properties. The lighter fractions contain quantities of acrolein and similar unsaturated compounds, phenolic compounds and some lower fatty acids. In the medium range of distillates is found higher fatty acids, almost completely saturated, complex ring compounds mostly solid at room temperature, and straight chain compounds. The highest boiling distillate is composed mainly of a mixture of waxy materials. This mixture may be separated into a solid waxy portion and a portion of the consistency of a very heavy vaseline.

The uses of the above products may be seen from the physical properties set out above. The still residue is an excellent thermoplastic resin, suitable for all applications to which resins have been put. It is an excellent tack agent and improves the adherence of paint preparations to which it is added. The fatty acids make an excellent hard soap, or may be employed in petroleum oil preparations. The waxes can be employed in candles, paper coating, cosmetics, etc. The phenolic fraction has shown decided germicidal properties and seems particularly valuable since, while of good volatility, its boiling point is sufficiently high to prevent rapid dissipation if used as a spray. The acrolein containing fraction has proved susceptible to polymerization to form thermosetting resins; the reaction is well known for this type of compound.

The reactions by which these materials are formed can only be hypothesized. Under the action of the acidic Twitchell's reagent, the unsaturated fatty acids form hydroxy sulpho-acids. Under the further catalytic action of the Twitchell reagent, at elevated temperature, the hydroxy acids form high molecular weight polymers by inter-esterification. The water released in the esterification would hydrolise the sulfonic group on the fatty acid molecule, resulting in a reformation of reagent. This would account for a true catalytic action of the reagent. The saturated acids partly distill as such and partly are cracked, yielding lower weight acids, straight chain compounds, unsaturated compounds, etc. The acrolein is most probably due, in part at least, to a residue of unrecovered glycerin. The reactions of the streols and the other waxy materials of the coffee oil are indeed unknown; but the phenolic compounds, and ring compounds, as well as the waxy materials, probably originate from the pyrolysis of this fraction of the coffee oil.

In a second procedure, the oil is not hydrolised previous to distillation. It is charged into the still or autoclave with a quantity of a dehydrating agent, such as potassium hydrogen sulphate, the dehydrating agent being present to the extent of several percent, depending on the agent. (Much less of magnesium sulphate is required, for instance, than of potassium hydrogen sulphate.) Twitchell's reagent, or an alkyl sulphate or sulphonate or any oil soluble substance of similar acidic character is also added to the extent of about 1%.

The still is connected with the fractionating column, under vacuum, and heated preferably slowly, to a maximum temperature in the neighborhood of 300-350° C. Up to a temperature of about 200° C., total reflux may be employed so that light unreacted constituents are returned to the still; or a total condenser may replace the fractionating column up to this temperature. Or the still may be kept closed up to 200° C. and then connected to a column as above. Thereafter, the column is put in regular operation and products are obtained similar to those described in the first procedure. However, a much larger percentage of acrolein is obtained, providing material for acrolein plastics. The resin remaining in the still is in general tougher, though less rubbery, than that obtained by the first procedure.

The reactions are probably similar to those in the first process except that now the glycerin of the glycerides takes part in the reactions. A portion of the glycerin is split or cracked off, and under the action of the dehydrating catalysts yields acrolein. The resin forms in the still as the result of a more complex esterification involving the glycerin. There is also a greater tendency to the formation of unsaturates in the presence of the catalyst.

Without departing from the scope of the invention described herein, the details of the process may be modified in the manner well known in the art by varying the time cycles, the apparatus, and the temperature points mentioned in the illustrative processes.

Having described the invention, what is claimed for Letters Patent is:

1. A process for obtaining resinous and volatile by-products from oil of the coffee bean, which comprises: heating the oil in the presence of water and a hydrolyzing agent to hydrolyze the fatty glycerides, separating the glycerine, subjecting the residue to increased temperature for a sufficient interval to effect polymerization, at least until a tough rubbery resinous compound is obtained, and separating the polymerized product from the volatile constituents.

2. A process for obtaining resinous and volatile by-products from oil of the coffee bean, which comprises: heating the oil under pressure in the presence of water and a hydrolyzing agent to hydrolyze the fatty glycerides, distilling off the resulting glycerine, subjecting the residue to increased temperature under pressure to effect polymerization, at least until a tough rubbery resinous compound is obtained, and separating the polymerized product from the volatile constituents by fractional distillation.

3. A process for obtaining resinous and volatile by-products from oil of the coffee bean, which comprises: heating the oil in the presence of water and an acid catalyst to hydrolyze the fatty glycerides, subjecting the residue to increased temperature for an interval sufficient to effect polymerization, at least until a tough rubbery resinous compound is obtained, and separating the polymerized product from the volatile constituents.

4. A process for obtaining resinous and volatile by-products from oil of the coffee bean, which comprises: heating the oil in the presence of water and a Twitchell reagent to hydrolyze the fatty glycerides, removing the glycerine, subjecting the residue to increased temperature under pressure to effect polymerization, at least until a tough rubbery resinous compound is obtained, and removing the volatile constituents from the polymerized product.

5. A process for obtaining resinous and volatile by-products from oil of the coffee bean, which comprises: heating the oil under pressure to about 100° C. in the presence of water and an acid catalyst to hydrolyze the fatty glycerides, removing the glycerine so formed, by distillation at reduced pressure, subjecting the residue to prolonged heating under pressure at about 250° C. to effect polymerization, and removing the volatile constituents up to about 300° C., from the polymerized product by fractional distillation at reduced pressure.

6. A process for obtaining resinous and volatile by-products from oil of the coffee bean, which comprises: heating the oil under pressure to about 100° C. in the presence of water and a Twitchell reagent to hydrolyze the fatty glycerides, removing the glycerine so formed, by distillation at reduced pressure in the presence of superheated steam, subjecting the residue to prolonged heating under pressure at about 250° C. to effect polymerization, and removing the volatile constituents up to about 300° C., from the polymerized product, by fractional distillation at reduced pressure and in the presence of superheated steam.

HERBERT S. POLIN.
ALBERT I. NERKEN.
HENRY WETTINGFELD, Jr.